US010375945B2

(12) United States Patent
Potts

(10) Patent No.: US 10,375,945 B2
(45) Date of Patent: Aug. 13, 2019

(54) FISHING ROD HOLDING APPARATUS AND RELATED BOAT AND METHOD

(71) Applicant: Scout Boats, Inc., Summerville, SC (US)

(72) Inventor: Steven E. Potts, Daniel Island, SC (US)

(73) Assignee: Scout Boats, Inc., Summerville, SC (US)

( * ) Notice: Subject to any disclaimer, the term of this patent is extended or adjusted under 35 U.S.C. 154(b) by 0 days.

(21) Appl. No.: 15/702,294

(22) Filed: Sep. 12, 2017

(65) Prior Publication Data

US 2018/0070574 A1    Mar. 15, 2018

Related U.S. Application Data

(60) Provisional application No. 62/394,511, filed on Sep. 14, 2016.

(51) Int. Cl.
*A01K 97/10* (2006.01)
*B63B 17/02* (2006.01)
*B63B 17/00* (2006.01)
*B63B 35/73* (2006.01)

(52) U.S. Cl.
CPC ............. *A01K 97/10* (2013.01); *B63B 17/02* (2013.01); *B63B 2017/0054* (2013.01); *B63B 2017/026* (2013.01); *B63B 2035/738* (2013.01)

(58) Field of Classification Search
CPC .. A01K 97/10; B63B 17/02; B63B 2017/026; B63B 17/0054; B63B 2035/738

USPC ............................................ 224/406; 43/21.2
See application file for complete search history.

(56) References Cited

U.S. PATENT DOCUMENTS

| | | | | |
|---|---|---|---|---|
| 3,792,775 A * | 2/1974 | Riddle | ................... | A01K 97/10 |
| | | | | 211/63 |
| 5,354,164 A * | 10/1994 | Goss | ..................... | B60P 3/1025 |
| | | | | 224/405 |
| 6,381,897 B1 * | 5/2002 | Walsh | ..................... | A01K 97/10 |
| | | | | 43/21.2 |
| 9,565,934 B2 * | 2/2017 | Hall, II | ................ | A47B 81/005 |
| 9,861,087 B1 * | 1/2018 | Arrazola | ................ | A01K 97/10 |
| 2003/0111101 A1 * | 6/2003 | Tull | ........................ | B63B 17/02 |
| | | | | 135/88.01 |
| 2008/0155882 A1 * | 7/2008 | Wegman | ................ | A01K 97/10 |
| | | | | 43/21.2 |
| 2009/0031942 A1 * | 2/2009 | Russikoff | ................ | B63B 17/02 |
| | | | | 114/361 |

* cited by examiner

*Primary Examiner* — Scott T McNurlen
(74) *Attorney, Agent, or Firm* — Womble Bond Dickinson (US) LLP

(57) ABSTRACT

A fishing rod holding apparatus is provided. The apparatus may include a crossbar and one or more rod receivers affixed to the crossbar. Each of the rod receivers may be configured to receive a fishing rod. Further, the apparatus may include at least one bracket engaged with the crossbar and configured to engage a boat. The apparatus may additionally include an actuator engaged with crossbar and configured to rotate the crossbar to change an angle of the one or more rod receivers with respect to the vertical plane. A related boat and a related boat accessory operation method are also provided.

11 Claims, 18 Drawing Sheets

FISHING ROD HOLDING APPARATUS AND RELATED BOAT AND METHOD

CROSS-REFERENCE TO RELATED APPLICATIONS

The present application claims priority to U.S. Provisional Patent Application No. 62/394,511 filed Sep. 14, 2016, the disclosure of which is incorporated herein by reference.

BACKGROUND

Field of the Disclosure

The present disclosure relates to boats. More particularly, the present disclosure relates to a fishing rod holding apparatus for boats.

Description of Related Art

Fishing rod holding apparatuses may be employed to hold fishing rods on a boat. Certain fishing rod holding apparatuses may be referred to as "rocket launchers" due to such devices including fishing rod receivers that may be viewed as resembling an apparatus employed to launch rockets. Such fishing rod receivers may be mounted to the roof of a boat such that when fishing rods are received therein, the fishing rods are elevated and out of the way of the occupants of the boat However, positioning fishing rods in this manner may have certain detriments. For example, positioning the fishing rods too low may interfere with movement of the passengers in the boat, and positioning of the fishing rods too high may interfere with other aspects of the boat and/or with passage of the boat under relatively low structures. Thus, advances with respect to fishing rod holding apparatuses and boats may be desirable.

BRIEF SUMMARY OF THE DISCLOSURE

The present disclosure relates to a fishing rod holding apparatus and related method. In some aspects, the fishing rod holding apparatus comprises a crossbar; one or more rod receivers affixed to the crossbar, each of the rod receivers being configured to receive a fishing rod; at least one bracket engaged with the crossbar and configured to engage a boat; and an actuator engaged with crossbar and configured to rotate the crossbar to change an angle of the one or more rod receivers with respect to a vertical plane.

In some other aspects, a boat comprises a roof structure; and a fishing rod holding apparatus, comprising: a crossbar; one or more rod receivers affixed to the crossbar, each of the rod receivers being configured to receive a fishing rod; at least one bracket engaged with the crossbar and engaged with the roof structure; and an actuator engaged with the crossbar and configured to rotate the crossbar to change an angle of the one or more rod receivers with respect to a vertical plane.

In some further aspects, a boat accessory operation method comprises providing a boat, the boat comprising: a roof structure; and a fishing rod holding apparatus, comprising: a crossbar; one or more rod receivers affixed to the crossbar, each of the rod receivers being configured to receive a fishing rod; at least one bracket engaged with the crossbar and engaged with the roof structure; and an actuator engaged with the crossbar; and actuating the actuator to rotate the crossbar and change an angle of the one or more rod receivers with respect to a vertical plane.

These and other features, aspects, and advantages of the disclosure will be apparent from a reading of the following detailed description together with the accompanying drawings, which are briefly described below.

BRIEF DESCRIPTION OF THE FIGURES

Figure 1:
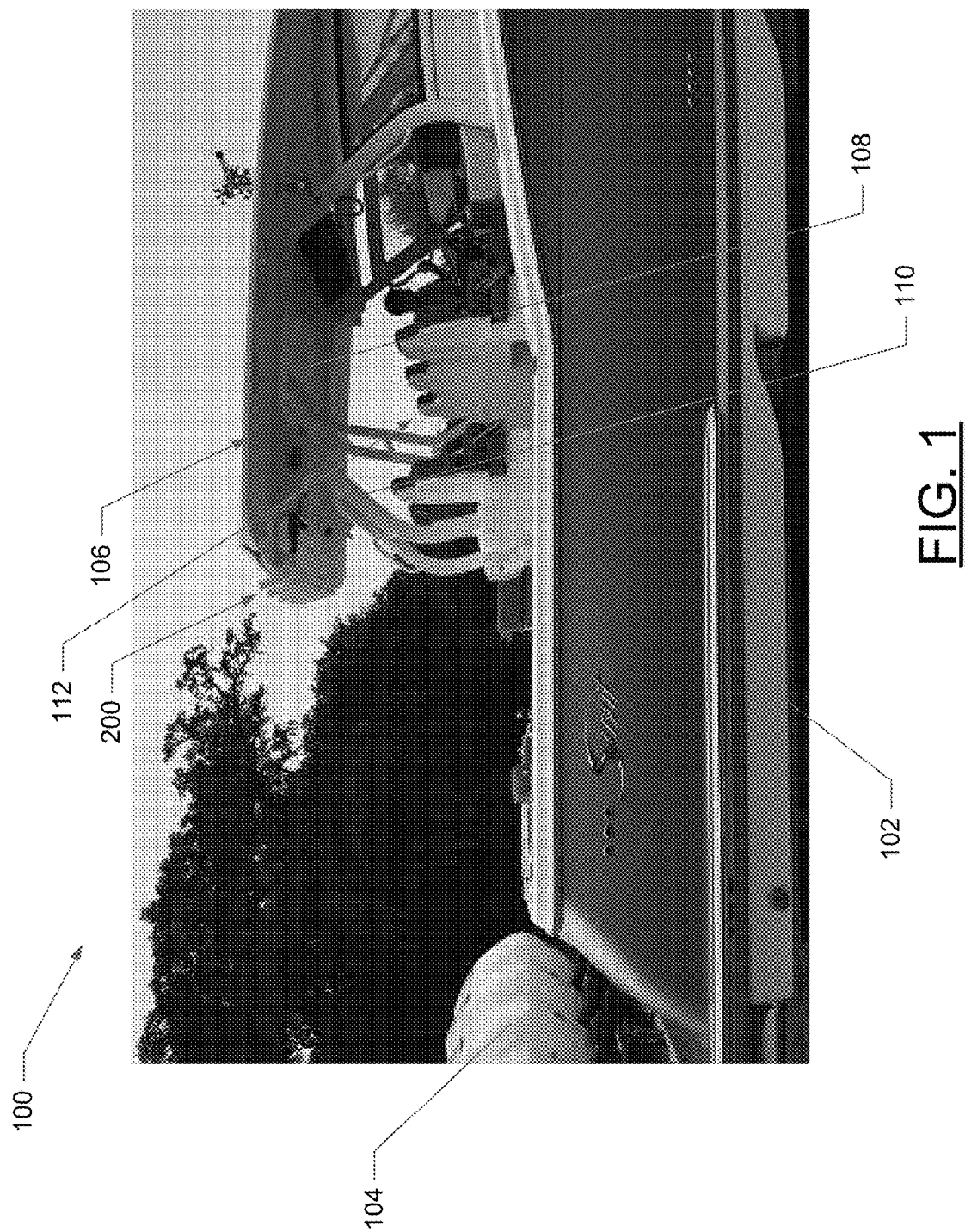
Figure 2:
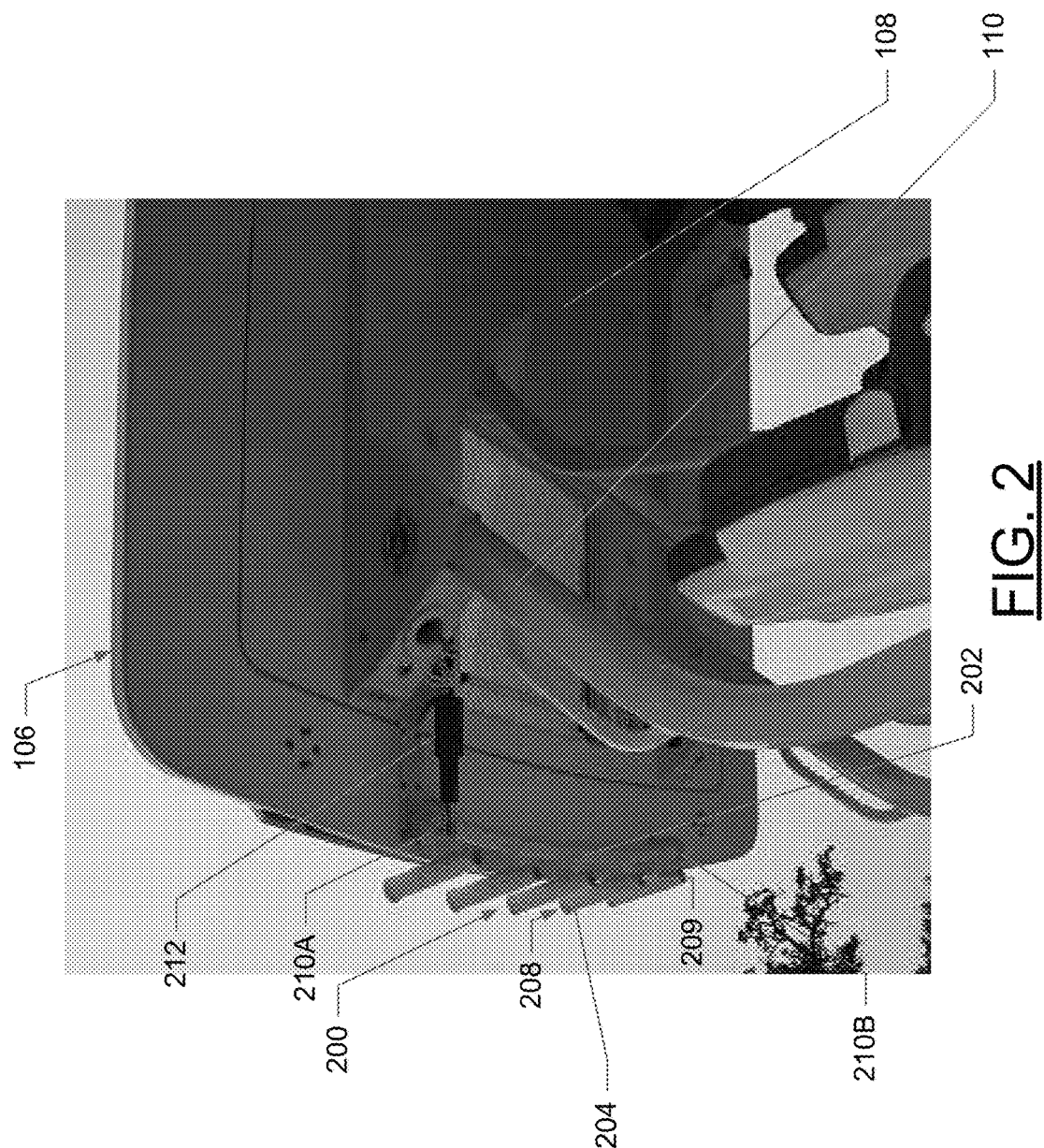
Figure 3:
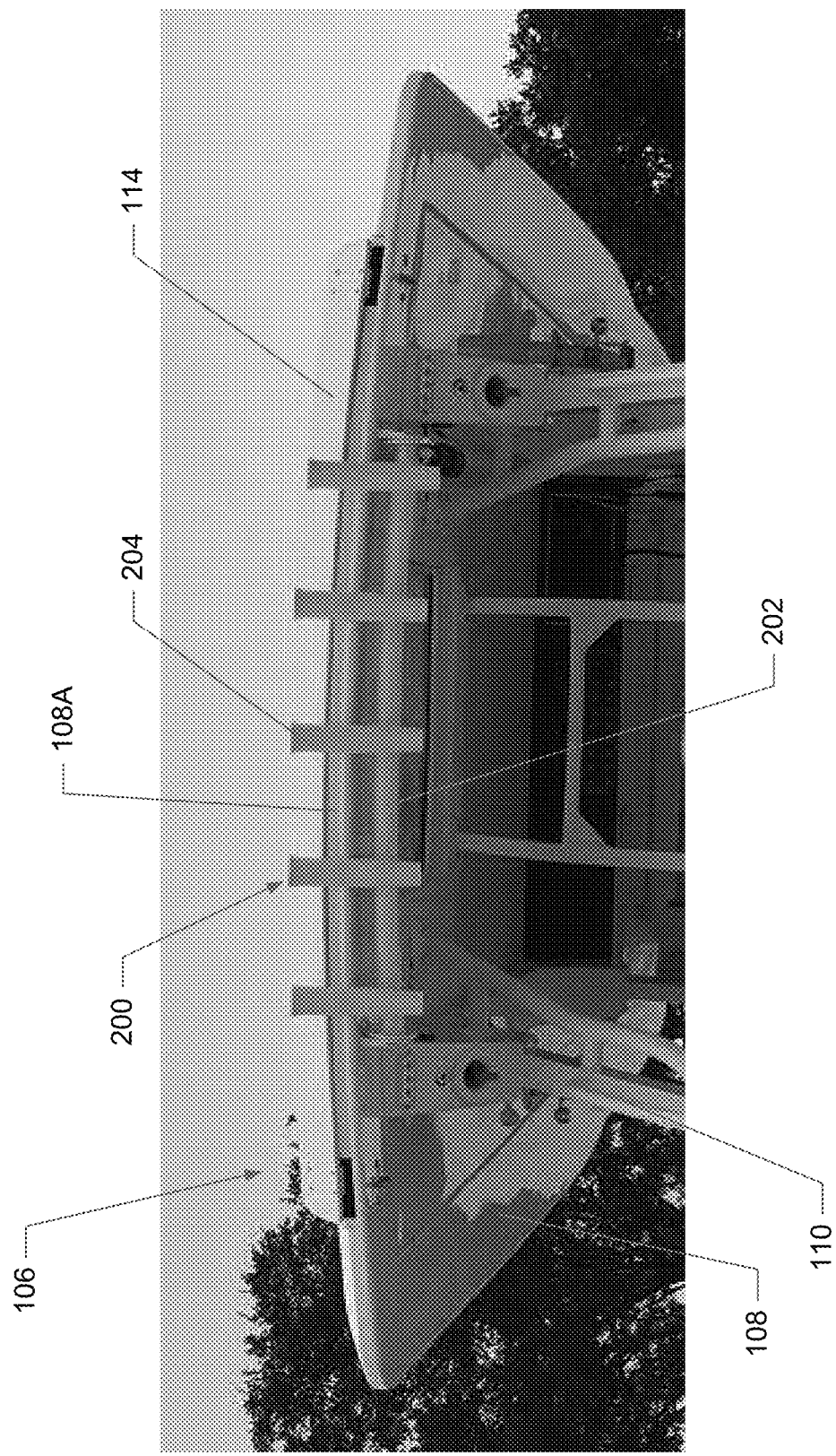
Figure 4:
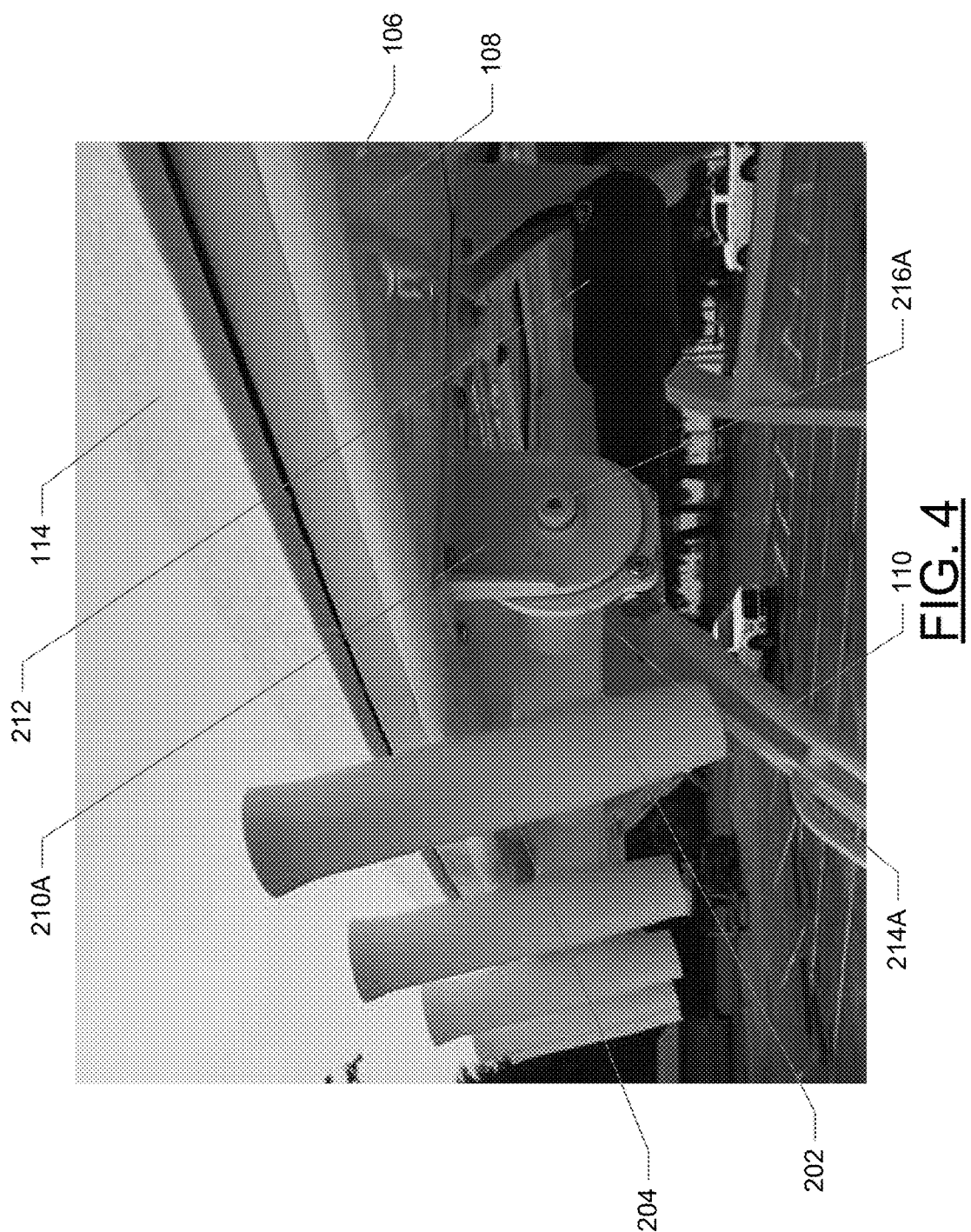
Figure 5:
Figure 6:
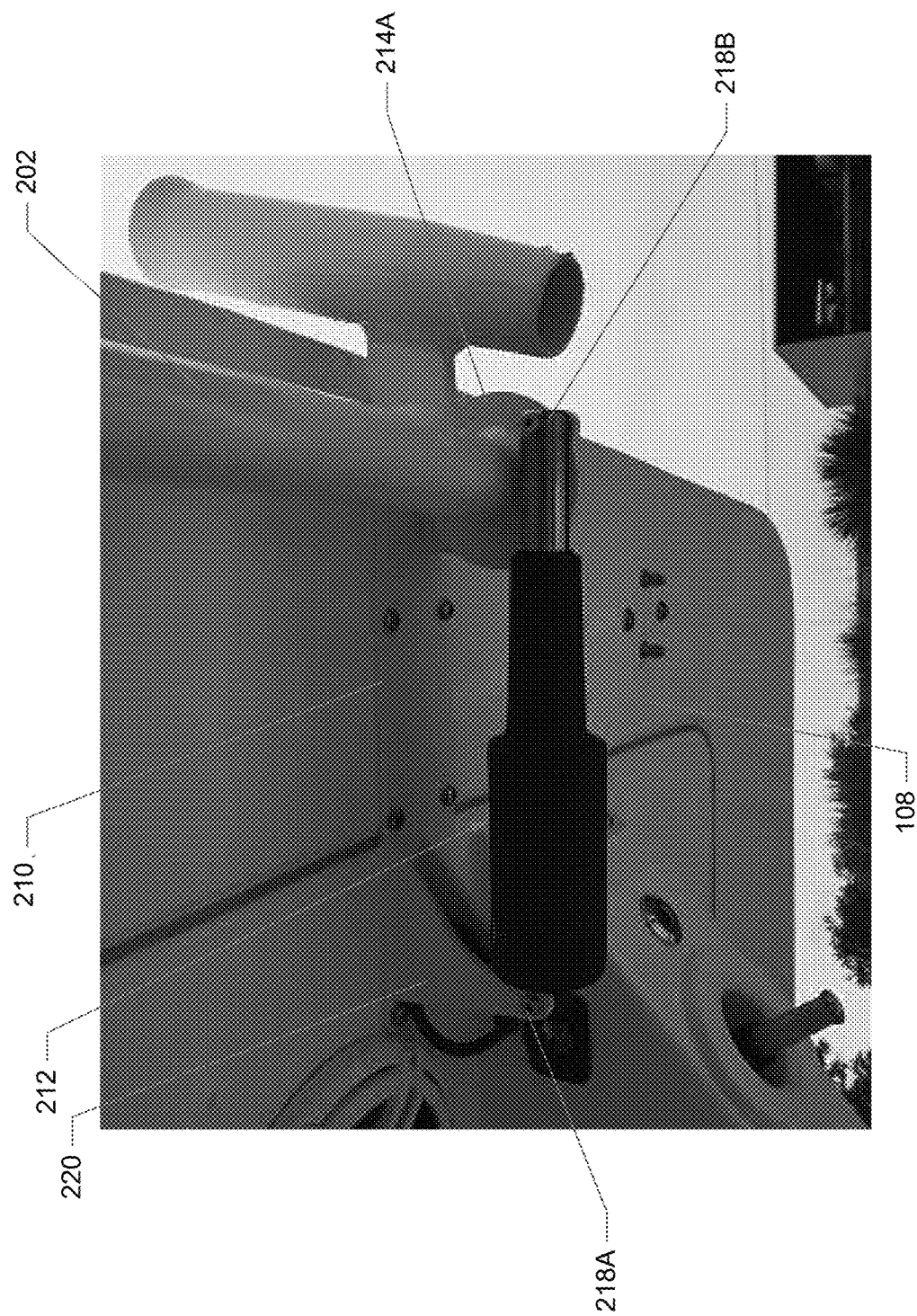
Figure 7:
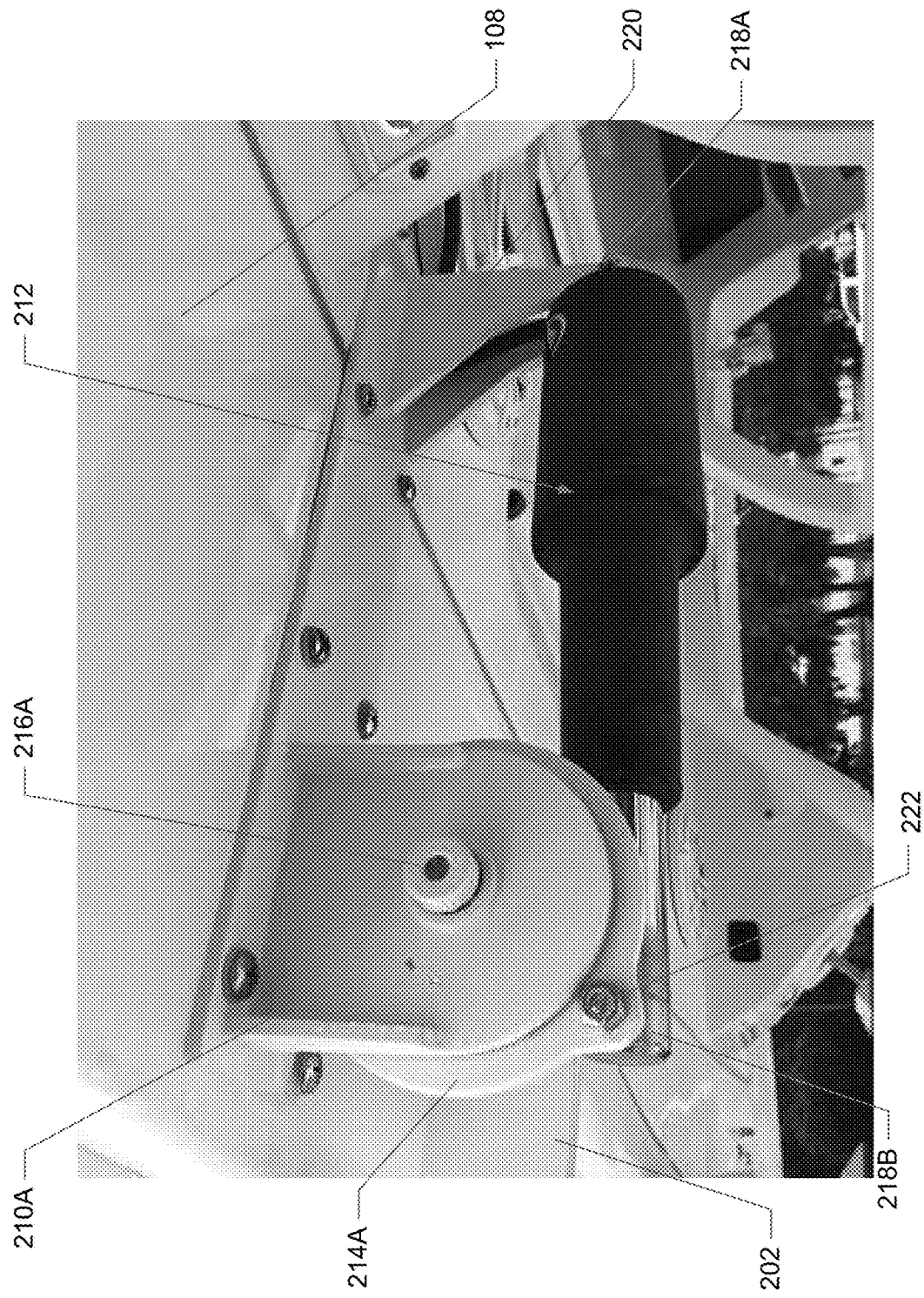
Figure 8:
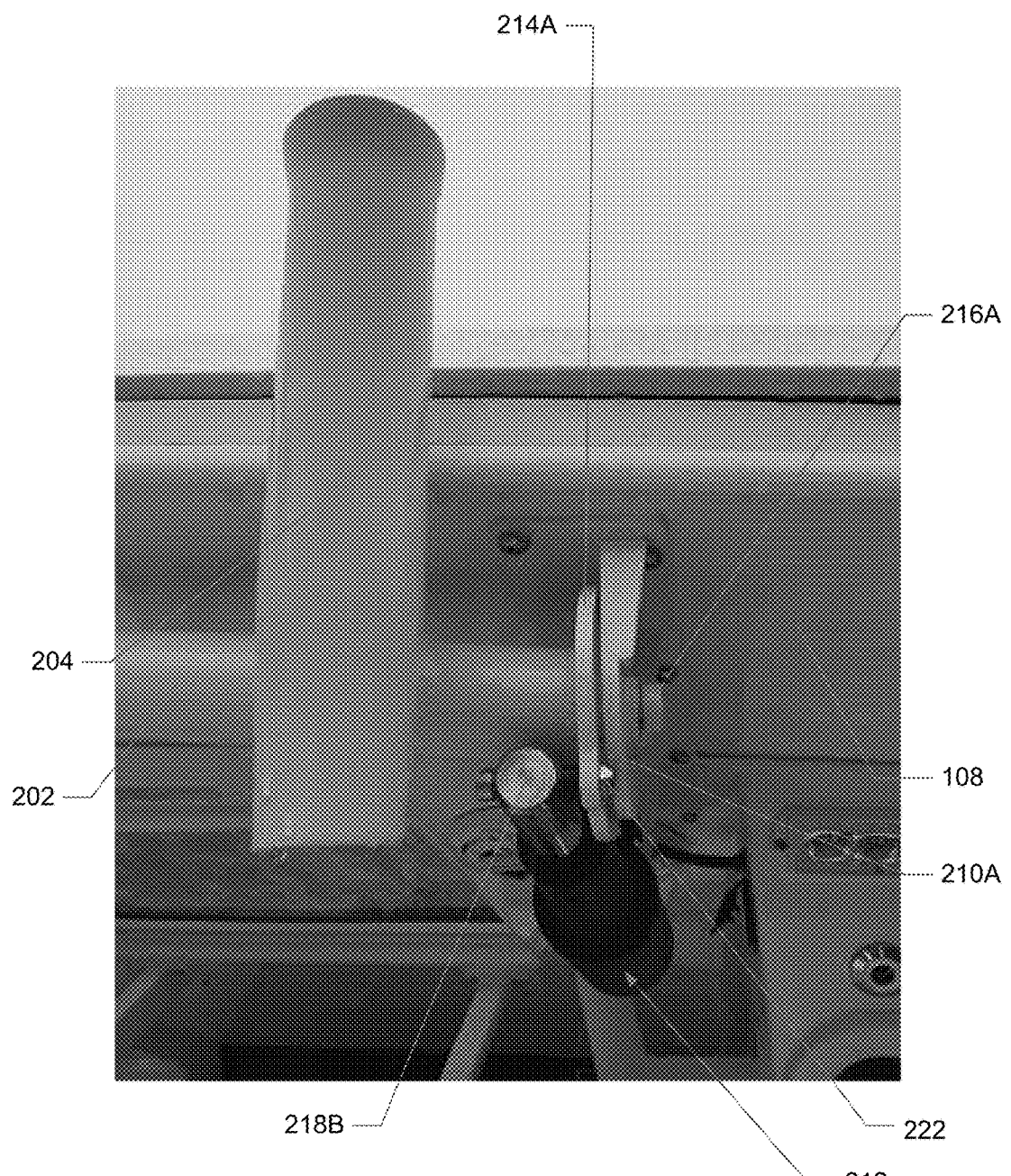
Figure 9:
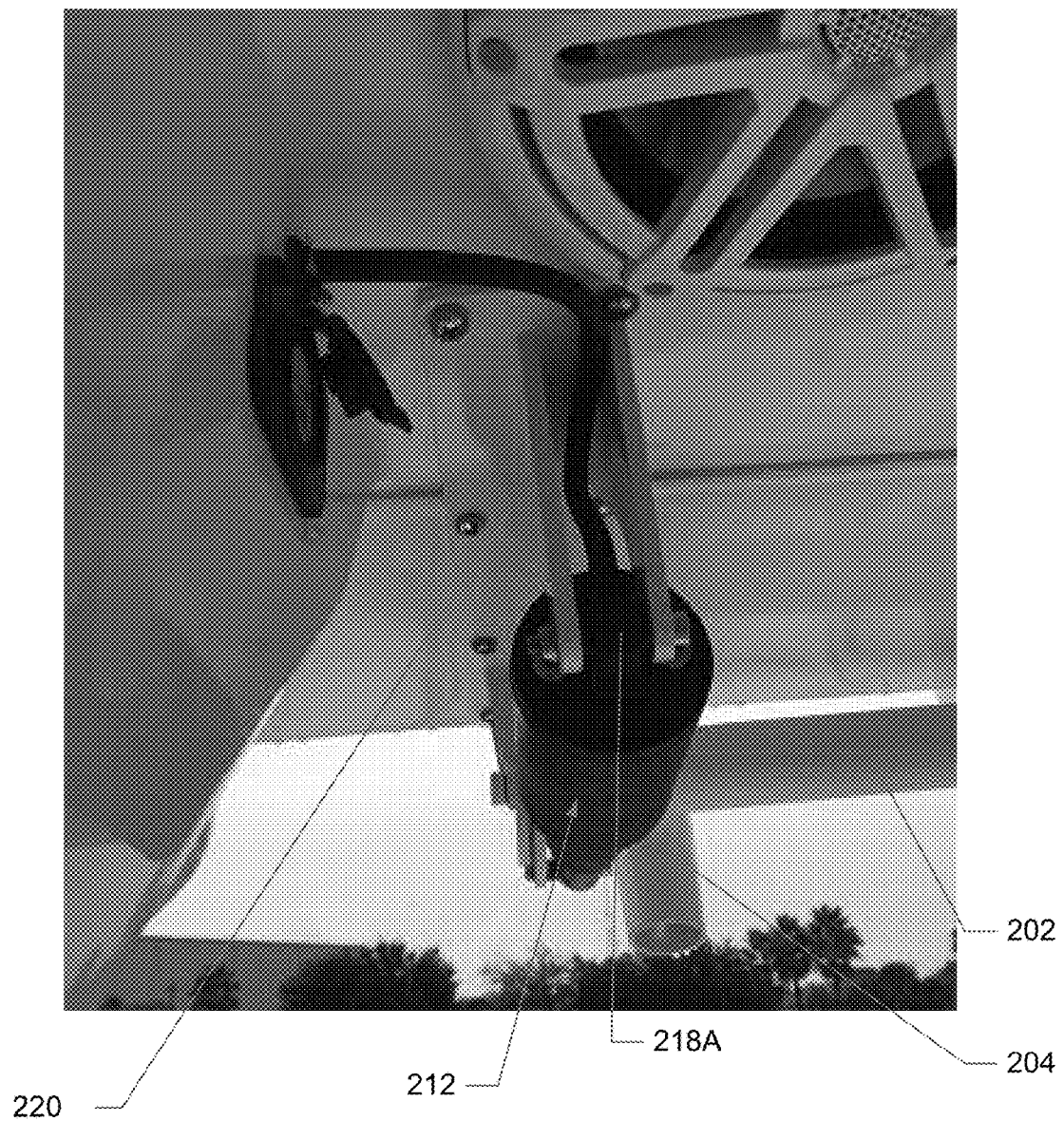
Figure 10:
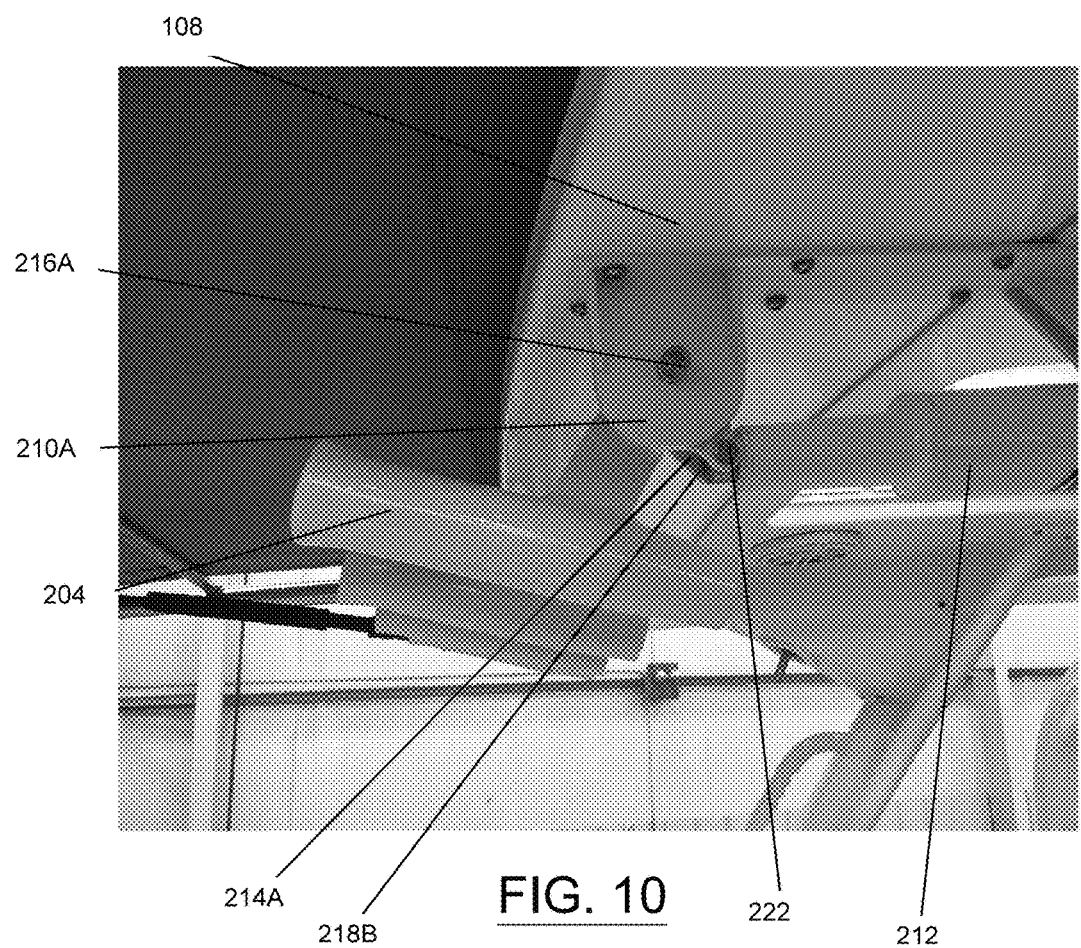
Figure 11:
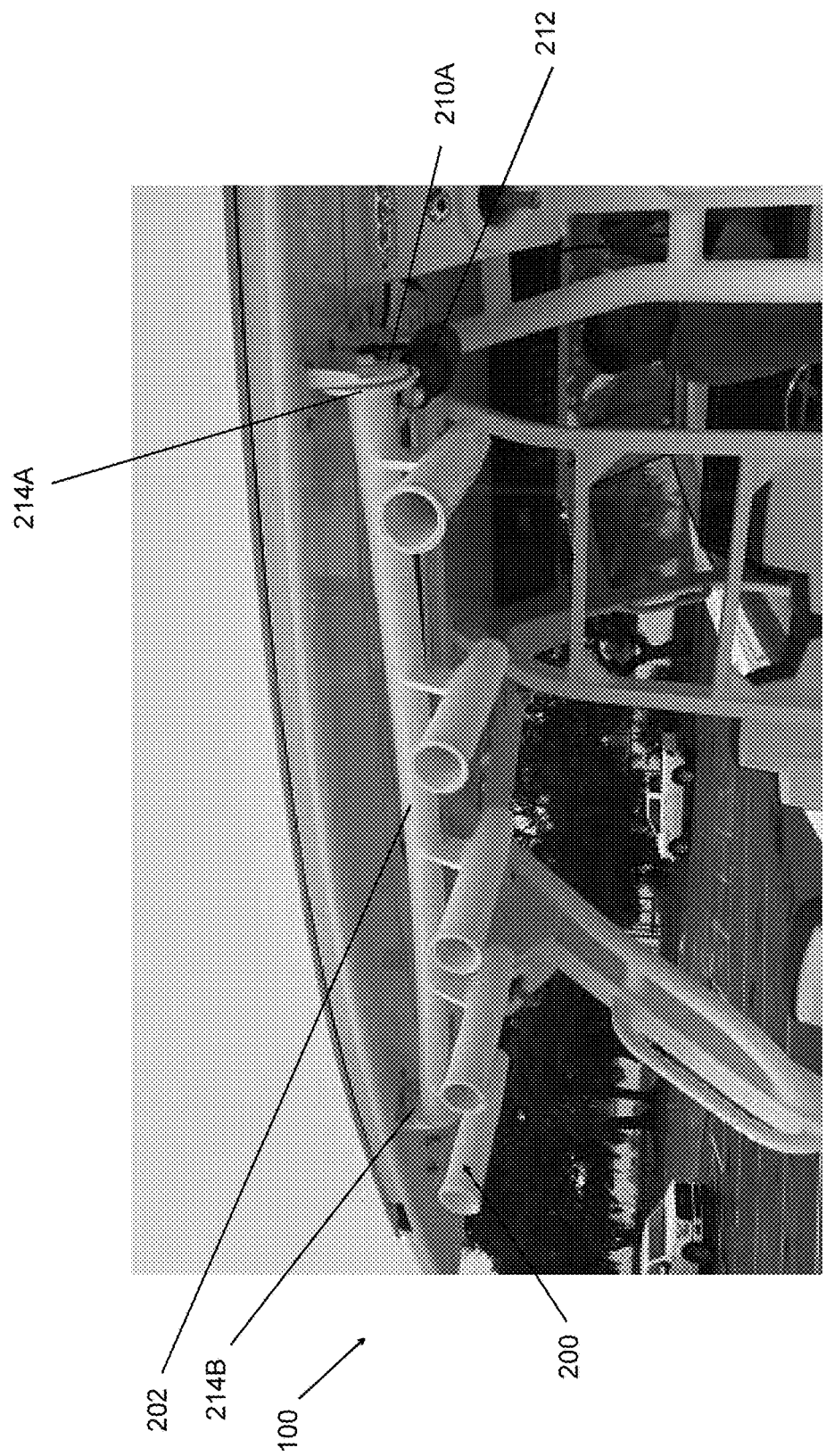
Figure 12:
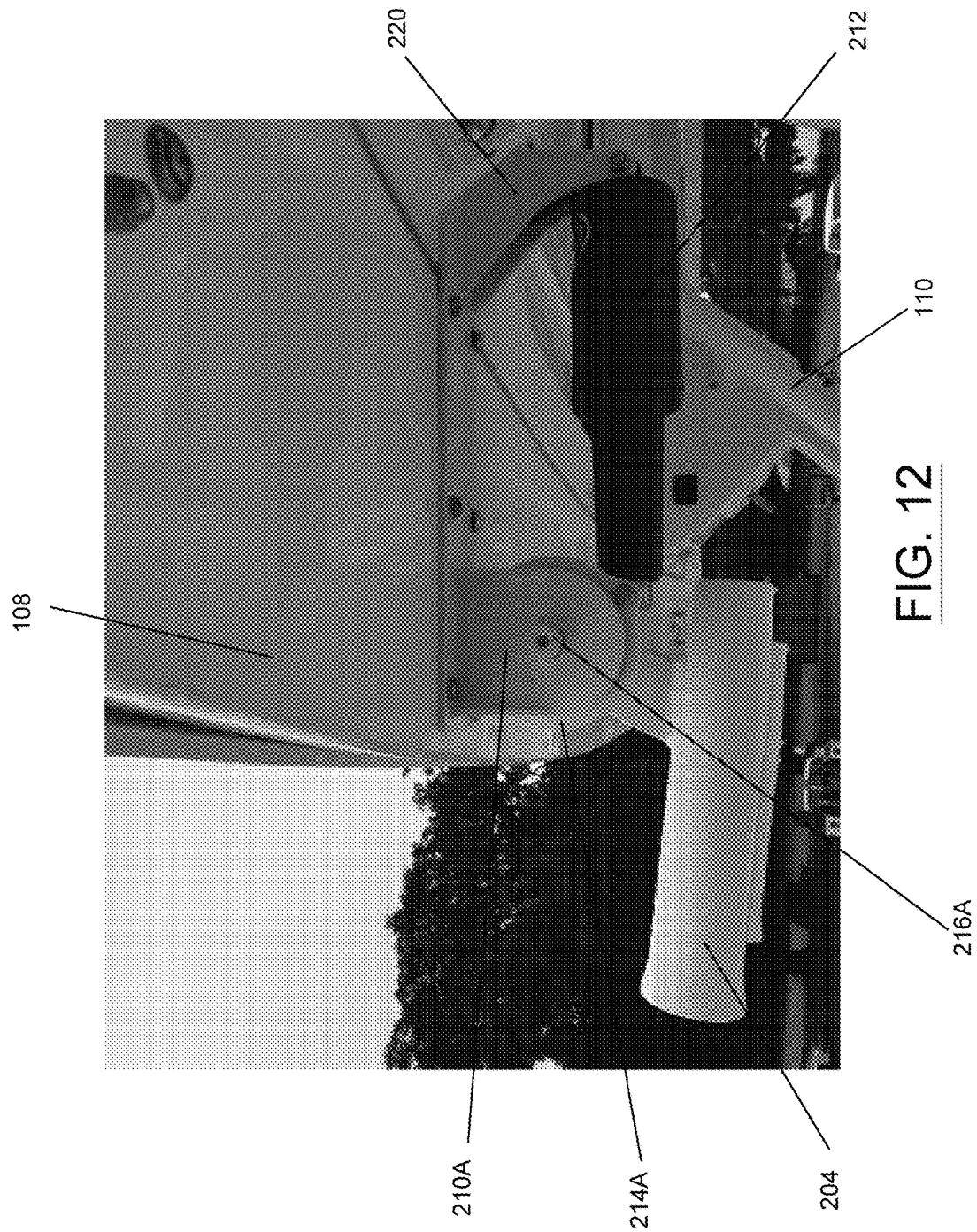
Figure 13:
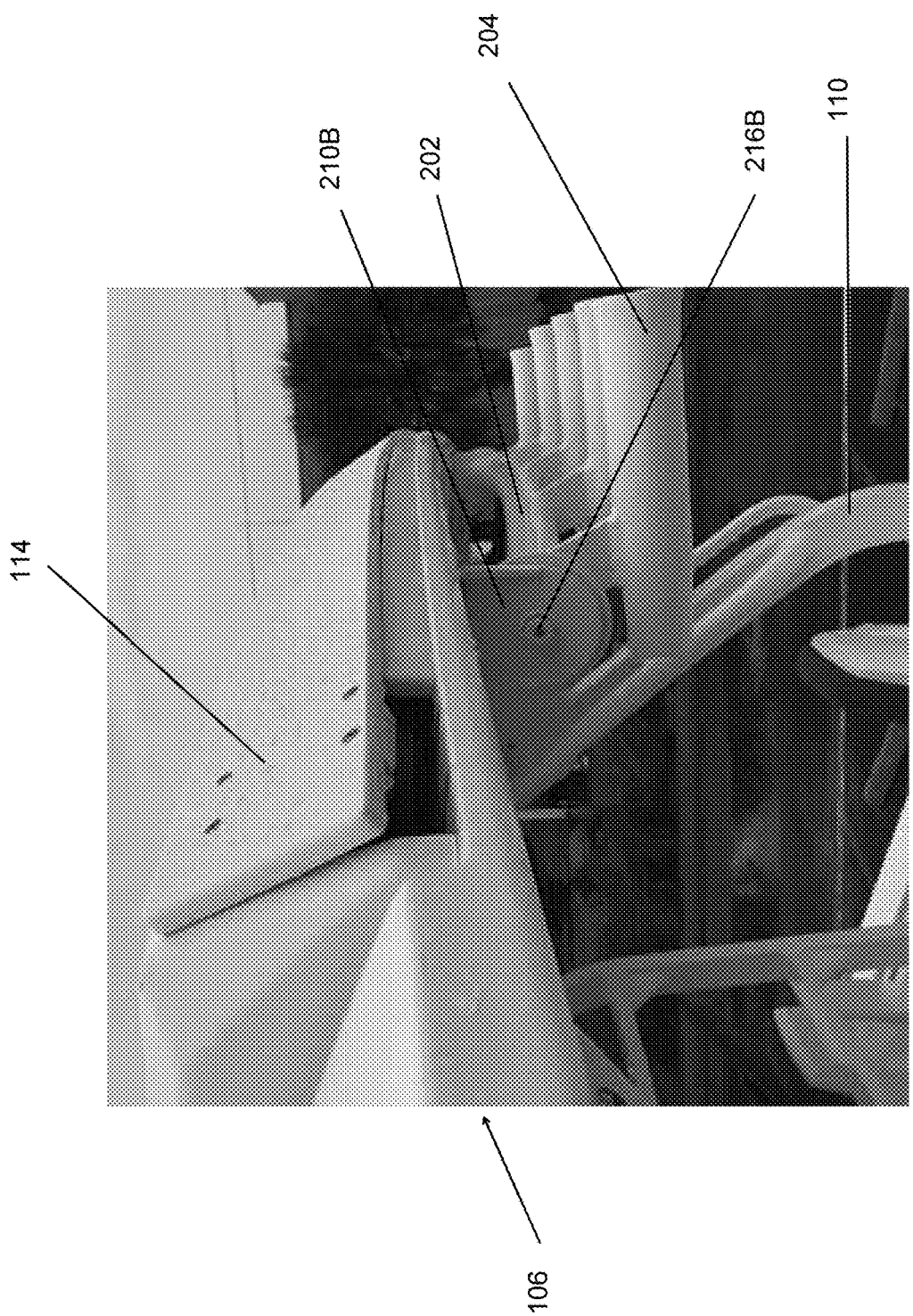
Figure 14:
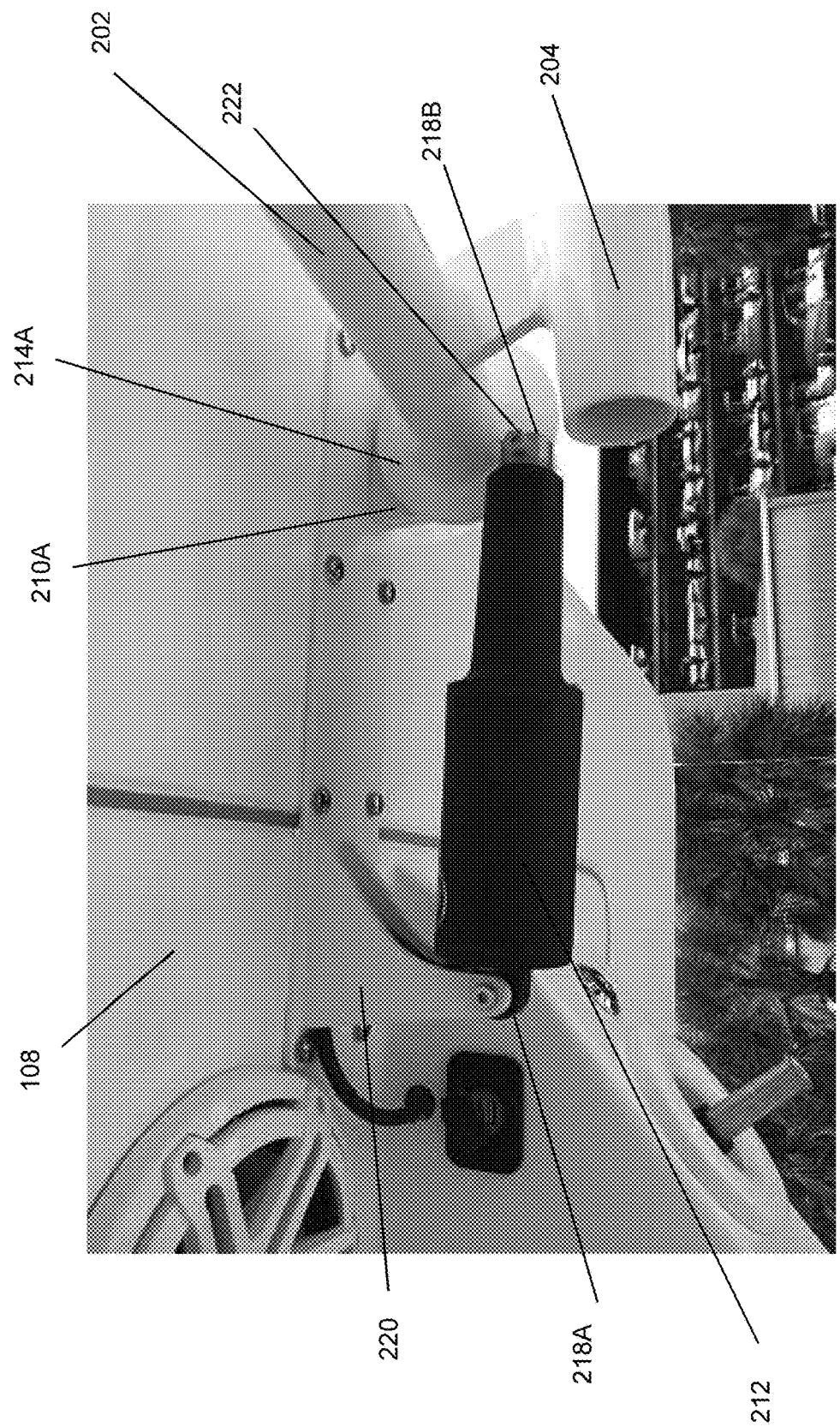
Figure 15:
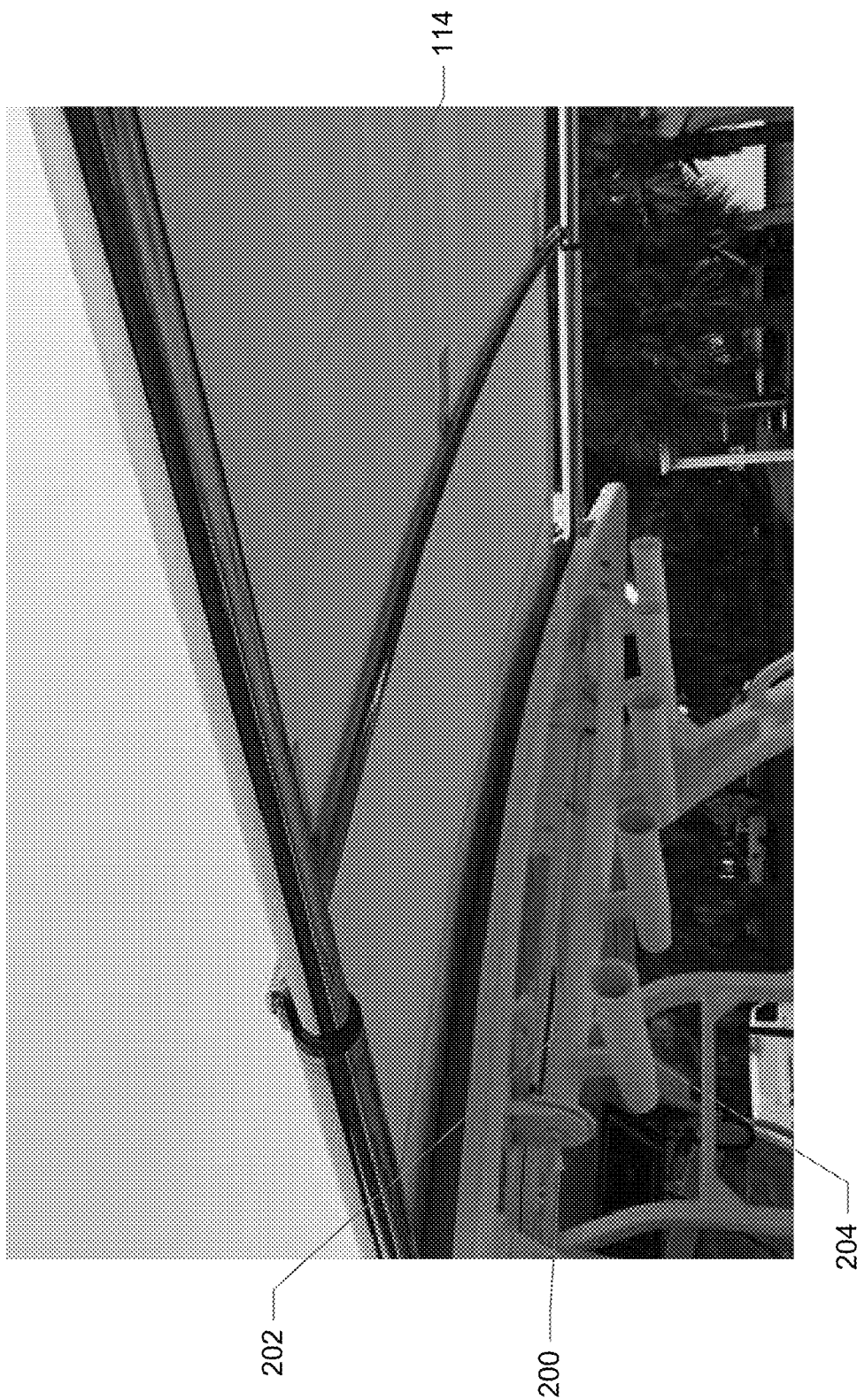
Figure 16:
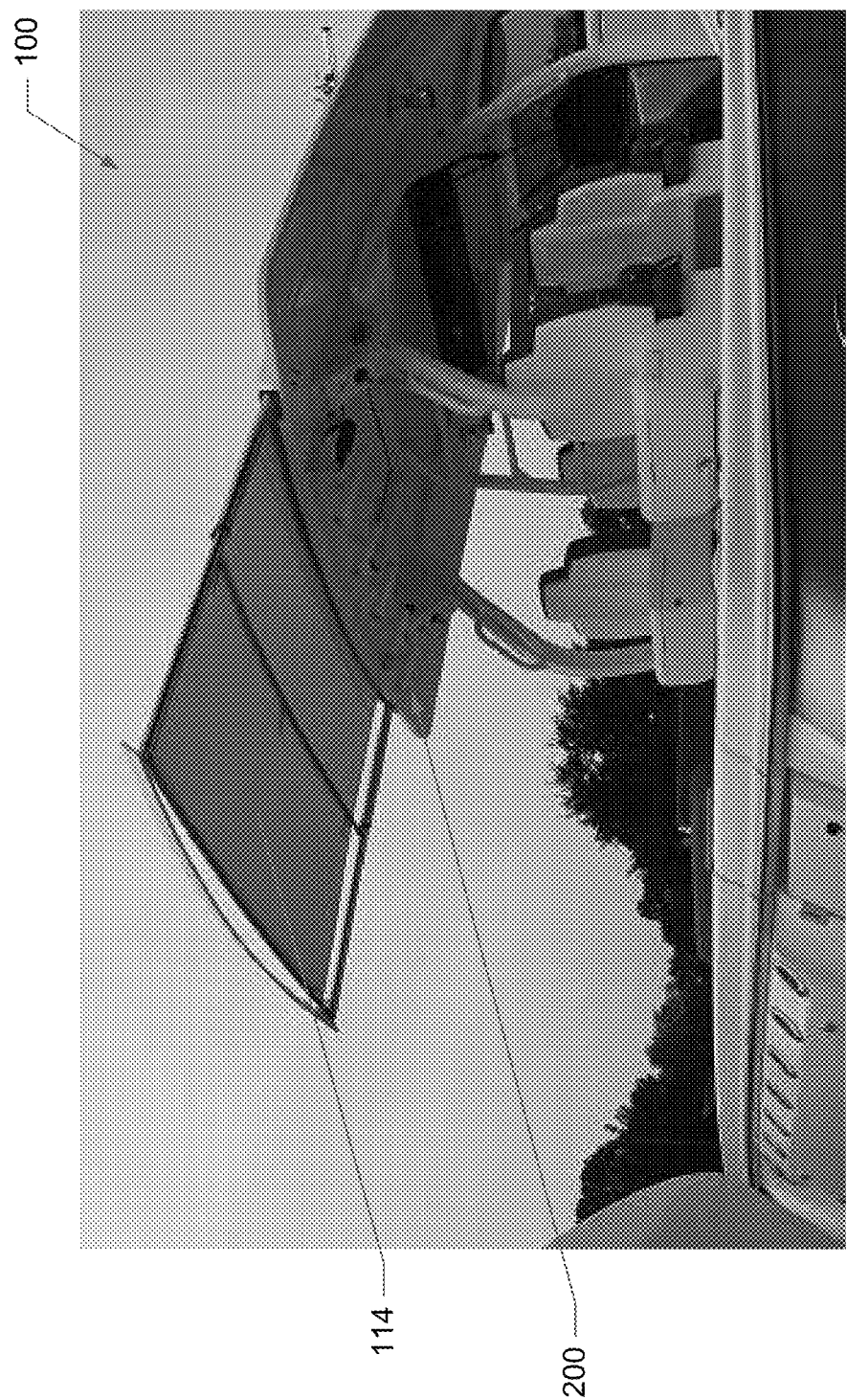
Figure 17:
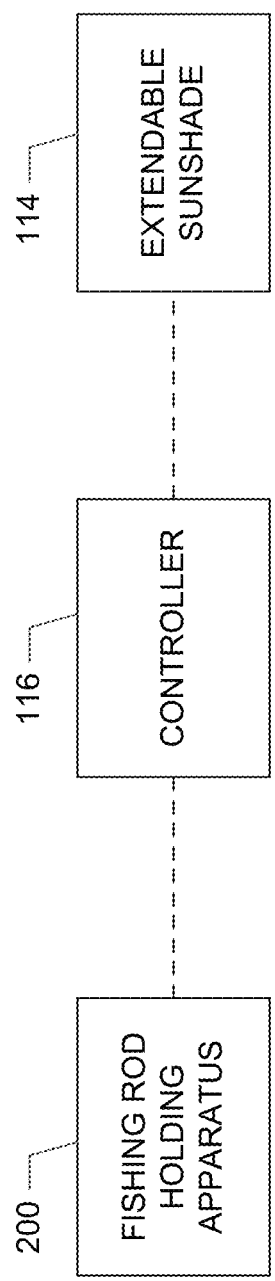
Figure 18:
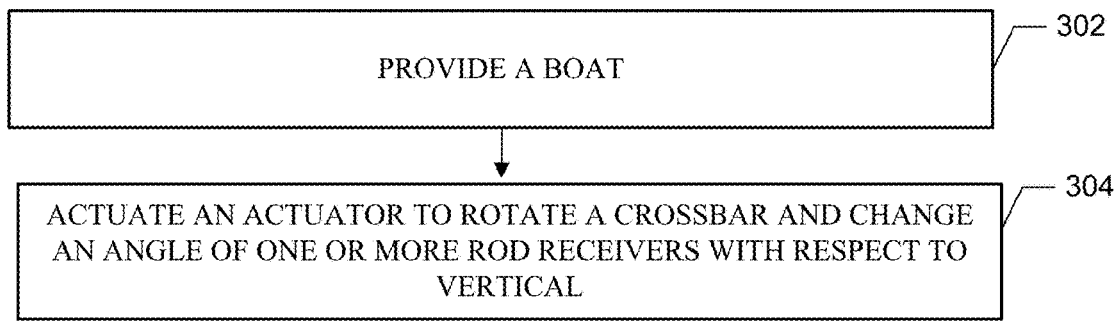

Having thus described the disclosure in the foregoing general terms, reference will now be made to the accompanying drawings, which are not necessarily drawn to scale, and wherein:

FIG. 1 illustrates a partial right side view of a boat including a fishing rod holding apparatus according to an example embodiment of the of the present disclosure;

FIG. 2 illustrates a view of an underside of a roof of the boat of FIG. 1 to which the fishing rod holding apparatus is engaged according to an example embodiment of the present disclosure;

FIG. 3 illustrates a rear view of the roof and the fishing rod holding apparatus of the boat of FIG. 1 according to an example embodiment of the present disclosure;

FIG. 4 illustrates a right perspective view of the fishing rod holding apparatus of the boat of FIG. 1 wherein rod receivers are in an upward configuration according to an example embodiment of the present disclosure;

FIG. 5 illustrates a left perspective view of the fishing rod holding apparatus of the boat of FIG. 1 wherein rod receivers are in an upward configuration according to an example embodiment of the present disclosure;

FIG. 6 illustrates a lower left view of an actuator of the fishing rod holding apparatus of the boat of FIG. 1 according to an example embodiment of the present disclosure;

FIG. 7 illustrates a right perspective view of the actuator of the fishing rod holding apparatus of the boat of FIG. 1 according to an example embodiment of the present disclosure;

FIG. 8 illustrates a rear perspective view of the actuator of the fishing rod holding apparatus of the boat of FIG. 1 according to an example embodiment of the present disclosure;

FIG. 9 illustrates a front perspective view of the actuator of the fishing rod holding apparatus of the boat of FIG. 1 according to an example embodiment of the present disclosure;

FIG. 10 illustrates a right perspective view of the actuator of the fishing rod holding apparatus of the boat of FIG. 1 according to another example embodiment of the present disclosure;

FIG. 11 illustrates a rear perspective view of the fishing rod holding apparatus of the boat of FIG. 1 wherein rod receivers are in a lowered configuration according to an example embodiment of the present disclosure;

FIG. 12 illustrates a right side view of the fishing rod holding apparatus of the boat of FIG. 1 wherein rod receivers are in a lowered configuration according to an example embodiment of the present disclosure;

FIG. 13 illustrates a left perspective view of the fishing rod holding apparatus of the boat of FIG. 1 wherein rod receivers are in a lowered configuration according to an example embodiment of the present disclosure;

FIG. 14 illustrates a lower left view of the actuator of the fishing rod holding apparatus of the boat of FIG. 1 wherein rod receivers are in a lowered configuration according to an example embodiment of the present disclosure;

FIG. 15 illustrates a partial left perspective view of the fishing rod holding apparatus and an extendable sunshade in an extended configuration according to an example embodiment of the present disclosure;

FIG. 16 illustrates a partial right rear view of the boat of FIG. 1 wherein the sunshade is in an extend configuration according to an example embodiment of the of the present disclosure;

FIG. 17 schematically illustrates a control configuration of the boat of FIG. 1 according to an example embodiment of the present disclosure; and FIG. 18 schematically illustrates a boat accessory operation method according to an example embodiment of the present disclosure.

DETAILED DESCRIPTION OF PREFERRED EMBODIMENTS

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural variations unless the context clearly dictates otherwise.

As described hereinafter, the present disclosure relates to a fishing rod holding apparatus. In this regard, FIG. 1 illustrates a boat 100 according to an example embodiment of the present disclosure. The boat 100 may include a hull 102, one or more engines 104, which may be inboard or outboard, and a roof structure 106. As may be understood, the particular configuration of the boat 100 may vary. Thus, it should be understood that the shape and configuration of the roof structure 106, for example, may vary without departing from the scope of the present disclosure.

The roof structure 106 may include a roof 108 and one or more roof supports 110. The roof supports 110 may extend from the hull 102 to the roof 108. The roof 108 may at least partially cover a seating area 112.

A fishing rod holding apparatus 200 may be coupled to the roof structure 106. In some embodiments the fishing rod holding apparatus 200 may be referred to as a "rocket launcher" due to the shape and configuration thereof. As illustrated in FIG. 2, the fishing rod holding apparatus 200 may include a crossbar 202. One or more rod receivers 204 may be affixed to the crossbar 202. For example, the rod receivers 204 may be welded to the crossbar 202 or otherwise be affixed such that the rod receivers are not moveable with respect to the crossbar.

Each rod receiver 204 may define a generally tubular configuration and may include a receiving aperture 208 which may be located generally at a top thereof. In this regard, each of the rod receivers 204 may be configured to receive a fishing rod therein. In particular, a handle portion of a rod may be inserted into the rod receiver 204 through the receiving aperture 208 such that the flexible rod portion extends upwardly and outwardly therefrom. Further, each rod receiver 204 may further include a lower aperture 209. The lower aperture 209 may allow a portion of the handle of the fishing rod to extend therethrough and/or allow water to drain from the rod receiver 204. In some embodiments the reel of the rod may contact the top of the rod receiver 204 to control the depth to which the fishing rod is received therein.

As illustrated in FIG. 3, the crossbar 202 may be curved. In this regard, roof 108 of the roof structure 106 may also be curved proximate the crossbar 202, at a rear edge 108A thereof. A radius of curvature of the crossbar 202 may substantially correspond to a radius of curvature of the roof 108 at the rear edge 108A. Thereby, the rod receivers 204 may be equally spaced from the roof 108 and avoid contact therewith.

Further, the fishing rod holding apparatus 200 may include at least one bracket engaged with the crossbar 202. In one embodiment, as illustrated in FIGS. 4 and 5, first and second brackets 210A, 210B (collectively, "brackets 210") are engaged with opposing ends of the crossbar 202. This configuration may provide for improved support of the crossbar 202. However, in other configurations the crossbar may be cantilevered from one bracket.

The brackets 210 may engage any portion of the boat 100. However, in a preferred embodiment the brackets 210 engage the roof structure 106. For example, the brackets 210 may engage the roof 108. In the illustrated embodiment the brackets 210 engage an underside of the roof 108.

Further, as illustrated in FIG. 2, the fishing rod holding apparatus 200 may include an actuator 212. The actuator 212 may be configured to rotate the crossbar 202 to change an angle of the one or more rod receivers 204 with respect to a vertical plane. As used herein a "vertical plane" refers to a plane substantially perpendicular to a horizontal plane at which the fishing rod holding apparatus 200 resides in in a retracted state. In this regard, the actuator 212 may be engaged with the crossbar 202.

In one embodiment, the crossbar 202 may include at least one end plate. For example, as illustrated in FIGS. 4 and 5, the crossbar 202 may include first and second end plates 214A, 214B (collectively, "end plates 214") at opposing ends thereof. The end plates 214 may be positioned inwardly of the brackets 210. As illustrated in FIG. 4, a first fastener 216A may extend through the first bracket 210A into a first end of the crossbar 202 at the first end plate 214A. Similarly, as illustrated in FIG. 5, a second fastener 216B may extend through the second bracket 210B into a second end of the crossbar 202 at the second end plate 214B. The brackets 210 may include a bearing or bushing through which the fasteners 216A, 216B extend.

As noted above, the actuator 212 may be configured to rotate the crossbar 202. In this regard, as illustrated in FIGS. 6-9, a first end 218A of the actuator 212 may be engaged with a stationary object on the boat. For example, the first end 218A of the actuator 212 may engage an extension 220 that extends from and is fixedly engaged with the roof 108 of the boat 100. In this example, a second end 218B of the actuator 212 may engage the first end plate 214A. In particular, the first end plate 214A may be configured for single, fixed point connection with the second end 218B of the actuator 212. As such, the first end plate 214A may include a fastener 222 that extends through the first end plate 214A and is configured to engage the second end 218B of the actuator 212 at a single point. For example, as illustrated in FIG. 7, the actuator 212 may engage the first end plate 214A at a single point via a fastener 222 (e.g., a bolt) positioned outwardly from the bracket 210A. The second end 218B of the actuator 212 at the opposing end of the crossbar is also similarly engaged with the second plate 214B.

In another example, as illustrated in FIG. 10, the first end plate 214A may be configured for at least a two point connection with the second end 218B of the actuator 212. More particularly, the first end plate 214A may be formed as a "forked" end plate 214A having a first fork and a second fork in spaced apart relation from one another and defining a recess therebetween. The recess between the first fork and the second fork may be configured to receive the second end 218B of the actuator 212 therebetween for engagement with the forked end plate 214A at a connection point between each of the first fork and the actuator and the second fork and the actuator, i.e., two connection points. The fastener 222 may be configured to extend through the second end 218B of the actuator 212 and be engaged with both forks of the forked end plate 214A. The second end 214B of the actuator 212 at the opposing end of the crossbar is also similar engaged with the second forked end plate 214B.

The actuator 212 may be configured to cause rotation of the crossbar 202. In this regard, the actuator 212 may comprise, by way of example, a pneumatic actuator, an electric actuator, or a hydraulic actuator, or a combination thereof. However, as may be understood, various other embodiments of actuators may be employed.

In the illustrated embodiment the actuator 212 is configured to extend and retract. In this regard, the actuator 212 may extend to move the one or more rod receivers 204 toward a vertical plane and retract to move the one or more rod receivers away from the vertical plane. The upward position, at which the rod receivers 204 extend toward the vertical plane and at which the actuator 212 is extended, is illustrated in FIGS. 1-9. Conversely, the downward position, at which the rod receivers 204 extend toward the horizontal and at which the actuator 212 is retracted, is illustrated in FIGS. 11-14.

The ability to move the rod receivers to the downward position may provide several benefits. As noted above, the fishing rod holding apparatus 200 may be engaged with a roof 108 of the boat 100 such that the fishing rod holding apparatus is at a relatively high height. In this regard, when the rod receivers 204 are in the downward position, it may be easier for a user to insert fishing rods into the rod holders, rather than having to reach above the fishing rod holding apparatus 200 to insert the rods downwardly.

Further, as noted above, the rod receivers 204 may extend substantially vertically in the upward position thereof. The height of the fishing rods received in the rod receivers 204 may thus add to the overall height of the boat 100. Accordingly, removal of the fishing rods from the rod receivers 204 may otherwise be required for the boat 100 to travel under bridges and other relatively low structures, which may be time consuming. Instead, each of the rod receivers 204 may be simultaneously rotated downwardly, in order to reduce the overall height of the boat 100.

Additionally, as illustrated in FIG. 3, the roof structure 106 may further comprise an extendable sunshade 114. The extendable sunshade 114 is illustrated in a retracted configuration in FIG. 3. The extendable sunshade 114 may be configured to extend rearward in order to cover a rear of the boat 100. However, as illustrated in FIGS. 3-5, the rod receivers 204 may interfere with a rearward extension path of the extendable sunshade 114. Accordingly, the rod receivers 204 may be rotated downwardly in order to avoid contact of extendable sunshade 114 with the rod receivers or any fishing rods received therein when the extendable sunshade is extended, as illustrated in FIGS. 15 and 16.

Further, in some embodiments the rod receivers 204 may be configured to rotate down from the upwardly extending position, which may correspond to a default position, in certain circumstances. In this regard, as illustrated in FIG. 17, the boat 100 may further include a controller 116. The controller 116 may be configured to actuate the actuator 212 of the fishing rod holding apparatus 200 to rotate the rod receivers 204 away from the vertical plane prior to extending the extendable sunshade 114. Further, the controller 116 may be configured to actuate the actuator 212 of the fishing rod holding apparatus 200 to rotate the rod receivers 204 back toward the vertical plane after retracting the extendable sunshade 214.

In an additional aspect a boat accessory operation method is provided. The method may include providing a boat at operation 302. The boat may include a roof structure and a fishing rod holding apparatus. The fishing rod holding apparatus may include a crossbar, one or more rod receivers affixed to the crossbar, each of the rod receivers being configured to receive a fishing rod, at least one bracket engaged with the crossbar and engaged with the roof structure, and an actuator engaged with the crossbar. The method may further include actuating the actuator to rotate the crossbar and change an angle of the one or more rod receivers with respect to the vertical plane at operation 304.

In some embodiments actuating the actuator to rotate the crossbar and change the angle of the one or more rod receivers with respect to the vertical plane at operation 304 may include extending the actuator to move the one or more rod receivers toward the vertical plane and retracting the actuator to move the one or more rod receivers away from the vertical plane. The roof may further include an extendable sunshade. The method may further include extending the sunshade, wherein actuating the actuator to rotate the crossbar and change the angle of the one or more rod receivers with respect to the vertical plane at operation 304 includes actuating the actuator to rotate the rod receivers away from the vertical plane prior to extending the extendable sunshade. The method may further include retracting the extendable sunshade, wherein actuating the actuator to rotate the crossbar and change the angle of the one or more rod receivers with respect to the vertical plane at operation 304 includes actuating the actuator to rotate the rod receivers toward the vertical plane after retracting the extendable sunshade.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. A boat, comprising:
    a roof structure comprising an extendable sunshade;
    a fishing rod holding apparatus, comprising:
        a crossbar;
        one or more rod receivers affixed to the crossbar, each of the rod receivers being configured to receive a fishing rod;
        at least one bracket engaged with the crossbar and engaged with the roof structure; and
        an actuator engaged with the crossbar and configured to rotate the crossbar to change an angle of the one or more rod receivers with respect to a vertical plane, wherein the actuator is configured to extend to move the one or more rod receivers toward the vertical plane and retract to move the one or more rod receivers away from the vertical plane; and
a controller, the controller being configured to actuate the actuator to rotate the rod receivers away from the vertical plane prior to extending the extendable sunshade.

2. The boat of claim 1, wherein the roof structure comprises a roof and one or more supports, wherein the at least one bracket is engaged with the roof.

3. The boat of claim 2, wherein the at least one bracket is engaged with an underside of the roof.

4. The boat of claim 1, wherein the crossbar includes at least one end plate positioned inwardly of the at least one bracket, the actuator being engaged with the end plate at at least one fixed connection point.

5. The boat of claim 4, wherein the at least one end plate is a forked end plate having a first fork and a second fork in spaced apart relation from one another and defining a recess therebetween, such that the actuator is configured to be received within the recess between the first fork and the second fork for engagement with the forked end plate at a connection point between each of the first fork and the actuator and the second fork and the actuator.

6. The boat of claim 1, wherein the crossbar is curved and the roof structure includes a roof that is curved proximate the crossbar, a radius of curvature of the crossbar corresponding to a radius of curvature of the roof.

7. The boat of claim 1, wherein the controller is further configured to actuate the actuator to rotate the rod receivers toward the vertical plane after retracting the extendable sunshade.

8. The boat of claim 1, wherein the controller is configured to actuate an electric actuator, a hydraulic actuator, a pneumatic actuator, or a combination thereof.

9. A boat accessory operation method, comprising providing a boat, the boat comprising:
a roof structure comprising an extendable sunshade; and
a fishing rod holding apparatus, comprising:
a crossbar;
one or more rod receivers affixed to the crossbar, each of the rod receivers being configured to receive a fishing rod;
at least one bracket engaged with the crossbar and engaged with the roof structure;
an actuator engaged with the crossbar; and
a controller configured to actuate the actuator to rotate the rod receivers away from a vertical plane prior to extending the extendable sunshade;
actuating the actuator with the controller to rotate the crossbar and change an angle of the one or more rod receivers with respect to a vertical plane, wherein actuating the actuator to rotate the crossbar and change the angle of the one or more rod receivers with respect to the vertical plane comprises extending the actuator to move the one or more rod receivers toward the vertical plane and retracting the actuator to move the one or more rod receivers away from the vertical plane; and
actuating the actuator with the controller to rotate the rod receivers away from the vertical plane prior to extending the extendable sunshade.

10. The boat accessory operation method of claim 9, further comprising extending the sunshade.

11. The boat accessory operation method of claim 10, further comprising retracting the extendable sunshade,
wherein actuating the actuator to rotate the crossbar and change the angle of the one or more rod receivers with respect to the vertical plane comprises actuating the actuator to rotate the rod receivers toward the vertical plane after retracting the extendable sunshade.

* * * * *